US010723629B2

(12) United States Patent
Kim et al.

(10) Patent No.: US 10,723,629 B2
(45) Date of Patent: Jul. 28, 2020

(54) APPARATUS OF MANUFACTURING AEROGEL SHEET

(71) Applicant: LG CHEM, LTD., Seoul (KR)

(72) Inventors: Ye Hon Kim, Daejeon (KR); Je Kyun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 113 days.

(21) Appl. No.: 15/738,511

(22) PCT Filed: Feb. 3, 2017

(86) PCT No.: PCT/KR2017/001218
§ 371 (c)(1),
(2) Date: Dec. 20, 2017

(87) PCT Pub. No.: WO2017/142237
PCT Pub. Date: Aug. 24, 2017

(65) Prior Publication Data
US 2018/0179074 A1 Jun. 28, 2018

(30) Foreign Application Priority Data

Feb. 16, 2016 (KR) .......................... 10-2016-0017995

(51) Int. Cl.
*C01B 33/158* (2006.01)
*B01J 37/04* (2006.01)
(Continued)

(52) U.S. Cl.
CPC ....... *C01B 33/1585* (2013.01); *B01J 13/0091* (2013.01); *B01J 27/24* (2013.01);
(Continued)

(58) Field of Classification Search
CPC .... B05C 1/08–10; D06B 23/025; D06B 1/16; C01B 33/145; C01B 33/158;
(Continued)

(56) References Cited

U.S. PATENT DOCUMENTS 4,687,685 A 8/1987 Melcher
4,742,699 A * 5/1988 Nakahara .................. B05C 1/10
101/119

(Continued)

FOREIGN PATENT DOCUMENTS

CN 86100061 12/1986
CN 102557577 7/2012
(Continued)

*Primary Examiner* — Dah-Wei D. Yuan
*Assistant Examiner* — Stephen A Kitt
(74) *Attorney, Agent, or Firm* — Dentons US LLP

(57) ABSTRACT

The present invention relates to an apparatus of manufacturing an aerogel sheet. The apparatus of manufacturing the aerogel sheet includes: a fixing vessel into which a blanket is inserted; and an impregnation device putting a silica sol precursor into the blanket inserted into the fixing vessel to impregnate and gelate the silica sol precursor, wherein the impregnation device includes a rotation roller moving from one end to the other end of a top surface of the blanket while rotating to put the stored silica sol precursor into the blanket and thereby to impregnate and gelate the silica sol precursor.

19 Claims, 9 Drawing Sheets

(51) Int. Cl.
  *B01J 13/00* (2006.01)
  *B29B 15/12* (2006.01)
  *B01J 31/02* (2006.01)
  *B05C 1/10* (2006.01)
  *D06B 1/16* (2006.01)
  *B01J 27/24* (2006.01)
  *C01B 33/145* (2006.01)

(52) U.S. Cl.
  CPC ........... *B01J 31/02* (2013.01); *B01J 31/0202* (2013.01); *B01J 37/04* (2013.01); *B05C 1/10* (2013.01); *B29B 15/122* (2013.01); *C01B 33/145* (2013.01); *C01B 33/158* (2013.01); *D06B 1/16* (2013.01)

(58) Field of Classification Search
  CPC ... C01B 33/1585; B01J 13/0091; B01J 31/02; B01J 31/0202; B01J 37/04; B29B 15/122
  See application file for complete search history.

(56) References Cited

U.S. PATENT DOCUMENTS

| | | | |
|---|---|---|---|
| 4,807,339 A * | 2/1989 | Hayashi | B05C 1/10 492/24 |
| 5,313,884 A * | 5/1994 | Lerner | B05C 1/06 101/348 |
| 5,789,075 A | 8/1998 | Frank et al. | |
| 6,241,928 B1 | 6/2001 | Hatsuda et al. | |
| 6,319,852 B1 | 11/2001 | Smith et al. | |
| 6,989,123 B2 | 1/2006 | Lee et al. | |
| 7,399,439 B2 | 7/2008 | Lee et al. | |
| 7,780,890 B2 | 8/2010 | Lee et al. | |
| 2005/0015889 A1* | 1/2005 | Zikeli | D06B 1/16 8/156 |
| 2005/0046086 A1 | 3/2005 | Lee et al. | |
| 2005/0167891 A1 | 8/2005 | Lee et al. | |
| 2006/0286813 A1 | 12/2006 | Meredith et al. | |
| 2007/0148435 A1 | 6/2007 | Meredith et al. | |
| 2007/0222116 A1 | 9/2007 | Gould et al. | |
| 2008/0093016 A1 | 4/2008 | Lee et al. | |
| 2008/0292889 A1 | 11/2008 | Harvey et al. | |
| 2011/0223329 A1 | 9/2011 | Meredith et al. | |
| 2011/0240907 A1 | 10/2011 | Sharma et al. | |
| 2012/0025127 A1* | 2/2012 | Yeo | C01B 33/155 252/62 |
| 2013/0296596 A1 | 11/2013 | Suh et al. | |
| 2015/0174602 A1* | 6/2015 | Fang | B05C 1/00 427/162 |

FOREIGN PATENT DOCUMENTS

| | | |
|---|---|---|
| CN | 102950780 | 3/2013 |
| EP | 2422950 A2 | 2/2012 |
| JP | 2007-524528 | 8/2007 |
| JP | 2008195851 | 8/2008 |
| JP | 2011-190136 | 9/2011 |
| JP | 2011190551 | 9/2011 |
| JP | 2016017255 | 2/2016 |
| KR | 10-2011-0082379 | 7/2011 |
| KR | 10-2011-0126381 | 11/2011 |
| KR | 10-1105436 | 1/2012 |
| KR | 10-2012-0012836 | 2/2012 |
| KR | 10-2012-0070948 | 7/2012 |
| KR | 10-1199958 | 11/2012 |
| KR | 10-2013-0123942 | 11/2013 |
| KR | 10-2014-0146814 | 12/2014 |
| KR | 10-2015-0019889 | 2/2015 |
| KR | 10-1506096 | 3/2015 |
| KR | 10-2015-0089319 | 8/2015 |
| KR | 10-2015-0090320 | 8/2015 |
| WO | 2010080237 | 7/2010 |
| WO | 2010143902 | 12/2010 |

* cited by examiner

APPARATUS OF MANUFACTURING AEROGEL SHEET

CROSS-REFERENCE TO RELATED APPLICATION

This application is a National Stage Application of International Application No. PCT/KR2017/001218 filed on Feb. 3, 2017, which claims priority to and the benefit of Korean Patent Application No. 10-2016-0017995, filed on Feb. 16, 2016, both of which are incorporated herein in their entirety by reference for all purposes as if fully set forth herein.

TECHNICAL FIELD

The present invention relates to an apparatus of manufacturing an aerogel sheet, and more particularly, to an apparatus of manufacturing an aerogel sheet, which impregnates a silica sol precursor at a uniform thickness to improve quality.

BACKGROUND ART

In general, aerogel is a high porosity material having high porosity of about 90% to about 99% in solids that are known up to date. A silica precursor solution is subjected to sol-gel polymerization reaction to from gel, and then, drying process is performed on the formed gel under supercritical or atmospheric conditions to obtain the aerogel. That is, aerogel has a pore structure filled with air.

The above-described aerogel is lightweight and has physical properties such as heat insulation and sound absorption due to the unique pore structure in which 90% to 99% of an internal space is empty. The greatest advantage of the above-described advantages is the high heat insulation having thermal conductivity of 30 mW/m·k or less, which is significantly lower than thermal conductivity of 36 mW/m·k that is thermal conductivity of an organic insulation material such as conventional Styrofoam and the like.

DISCLOSURE OF THE INVENTION

Technical Problem

The aerogel sheet according to the related art is manufactured by using the apparatus of manufacturing the aerogel sheet. In the apparatus of manufacturing the aerogel sheet, the silica sol precursor is injected to a surface of a blanket to impregnate and gelate the silica sol precursor and thereby to manufacture the aerogel sheet.

However, the apparatus of manufacturing the aerogel sheet according to the related art has problems that the silica sol precursor is not uniformly impregnated on an outer portion of the blanket to cause defective products.

The present invention has been made to solve the above-mentioned problems, and an object of the prevent invention is to provide an apparatus of manufacturing an aerogel sheet, which impregnates a silica sol precursor to a surface of a blanket at a uniform thickness to improve quality of the aerogel sheet.

Technical Solution

To achieve the above-described object, an apparatus of manufacturing an aerogel sheet includes: a fixing vessel into which a blanket is inserted; and an impregnation device putting a silica sol precursor into the blanket inserted into the fixing vessel to impregnate and gelate the silica sol precursor, wherein the impregnation device includes a rotation roller moving from one end to the other end of a top surface of the blanket while rotating to put the stored silica sol precursor into the blanket and thereby to impregnate and gelate the silica sol precursor.

A plurality of injection nozzles, which discharge the stored silica sol precursor, may be provided on an outer circumferential surface of the rotation roller.

Each of the injection nozzles may protrude outward from the circumferential surface of the rotation roller.

The rotation roller may move from one end to the other end of the top surface of the blanket at the same height.

The impregnation device may include a rotation member rotating the rotation roller.

The impregnation device may include a moving member moving the rotation roller from one end to the other end of the top surface of the blanket.

The impregnation device may include an elevation member allowing the rotation roller to descend to the top surface of the blanket or ascend from the top surface of the blanket.

The elevation member may primarily adjust a height of the rotation roller so that an injection nozzle disposed at a lower portion of the injection roller is inserted up to a bottom surface of the blanket and secondarily adjust a height of the rotation roller so that the injection nozzle is inserted at an inner center of the blanket.

The primary height adjustment of the rotation roller by the elevation member may be performed when the rotation roller moves forward from the one end to the other end of the top surface of the blanket.

The secondary height adjustment of the rotation roller by the elevation member may be performed when the rotation roller moves backward from the one end to the other end of the top surface of the blanket.

The apparatus may further include a supply device supplying the silica sol precursor to the rotation roller.

The supply device may include a silica sol vessel in which silica sol is accommodated, a catalyst vessel in which a gelling catalyst is accommodated, a mixing vessel in which the silica sol of the silica sol vessel and the gelling catalyst of the catalyst vessel are introduced and mixed to prepare the silica sol precursor, and a connection tube connecting the mixing vessel to the rotation roller.

The silica sol may be prepared by mixing tetraethyl orthosilicate (TEOS) with ethanol.

The tetraethyl orthosilicate (TEOS) may include hydrolyzed TEOS.

The gelling catalyst may be prepared by mixing ethanol with ammonia water ($NH_4OH$).

The connection tube may be connected to a rotation shaft of the rotation roller so as to be freely rotatable and sealed.

Advantageous Effects

The present invention has effects as follows.

First: the apparatus of manufacturing the aerogel sheet may be used to improve the impregnation of the silica sol precursor put into the blanket and thus improve the quality of the aerogel sheet.

Second: the injection nozzle of the rotation roller provided in the apparatus of manufacturing the aerogel sheet may be exposed to the outside to improve the impregnation because the silica sol precursor is put into the blanket.

Third: the rotation roller may rotate at the same height and also move forward and backward to uniformly adjust the height of the silica sol precursor put into the blanket.

Fourth: the apparatus of manufacturing the aerogel sheet may include the rotation member, the moving member, and the elevation member to adjust the rotation rate, the moving rate, and the height of the rotation roller.

BRIEF DESCRIPTION OF THE DRAWINGS

FIG. 8 is a view illustrating a state in which a silica sol precursor is prepared, and FIG. 9 is a view illustrating a state in which the silica sol precursor is put into the blanket while the rotation roller rotates.

MODE FOR CARRYING OUT THE INVENTION

Figure 1:
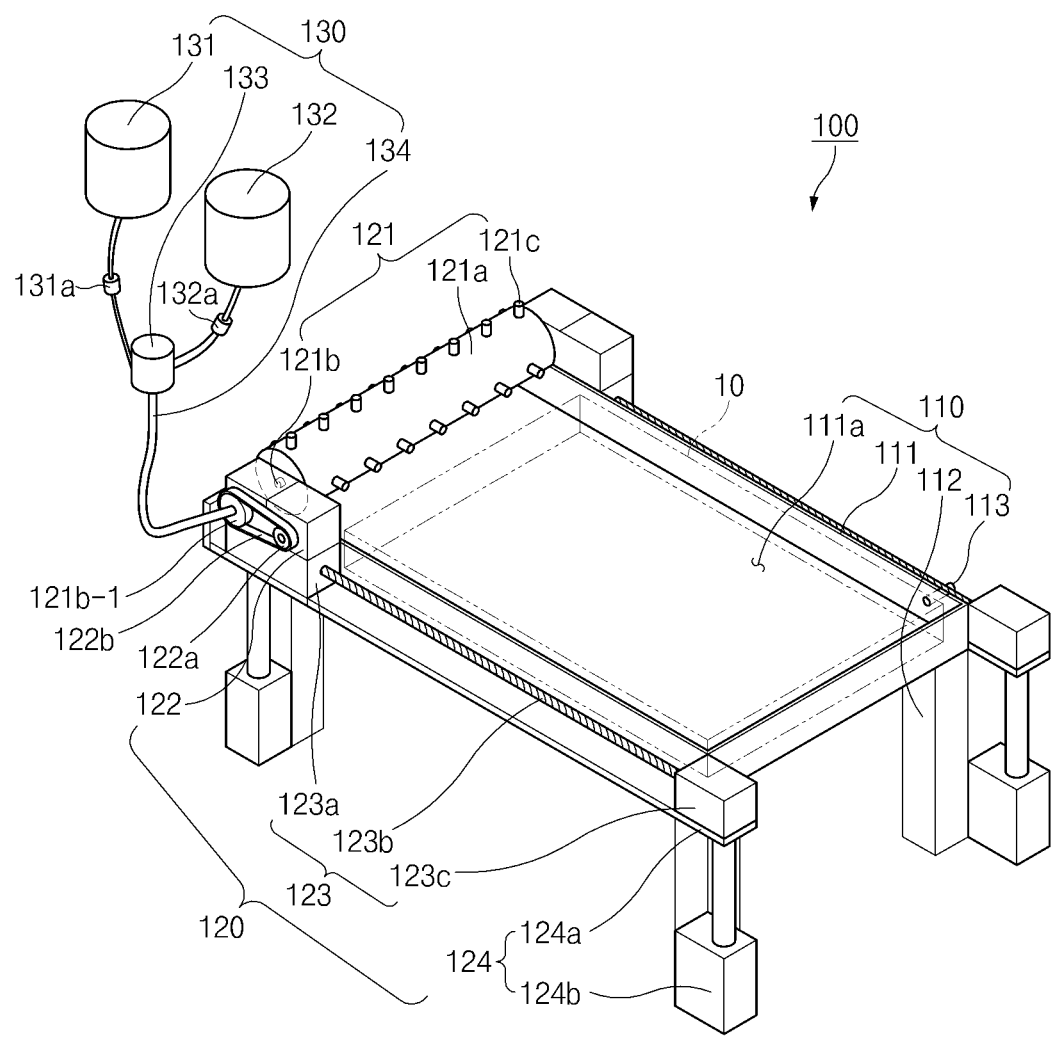
FIG. 1 is a perspective view illustrating an apparatus of manufacturing an aerogel sheet according to the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

An apparatus 100 of manufacturing an aerogel sheet according to the present invention includes, as illustrated in FIG. 1, a fixing vessel 110 into which a blanket 10 is inserted and an impregnation device 120 putting a silica sol precursor into the blanket 10 inserted into the fixing vessel 110 to impregnate and gelate the silica sol precursor.

The fixing vessel 110 is configured to accommodate the blanket 10. The fixing vessel 110 includes a fixing member 111 having an accommodation groove 111a, in which the blanket 10 is accommodated, in a top surface thereof and a plurality of fixing legs 112 spacing the fixing member 111 apart from the ground. Here, a discharge part 113 is provided in a side surface of the accommodation groove 111a. The discharge part 113 is openably provided to collect the silica sol precursor 40 putted in the accommodation groove 111a.

Although one fixing vessel 110 having a rectangular shape is provided in an embodiment of the present invention, the present invention is not limited thereto. For example, the fixing vessel 110 may have various shapes such as a disk shape, a cylindrical shape, a rectangular shape, and the like.

Also, a cover (not shown) for protecting the blanket 10 provided in the accommodation groove 111a may be coupled to a top surface of the fixing vessel 110. The cover may be made of a transparent or translucent material having high strength.

Figure 2:
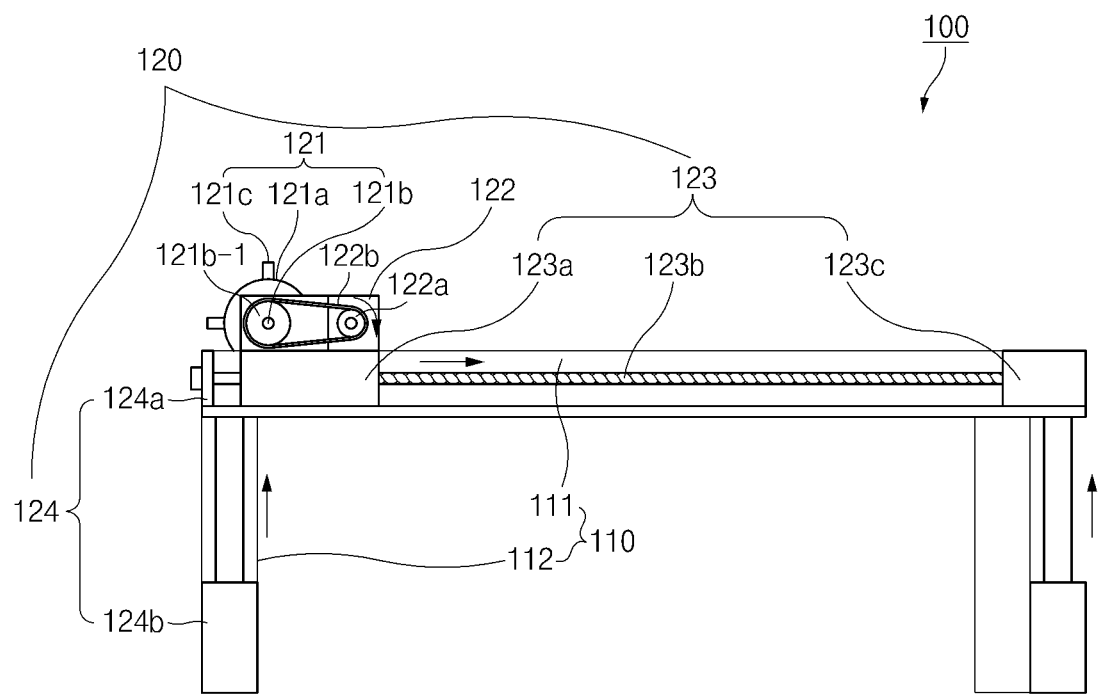
FIG. 2 is a side view illustrating the apparatus of manufacturing the aerogel sheet according to the present invention.
Figure 3:
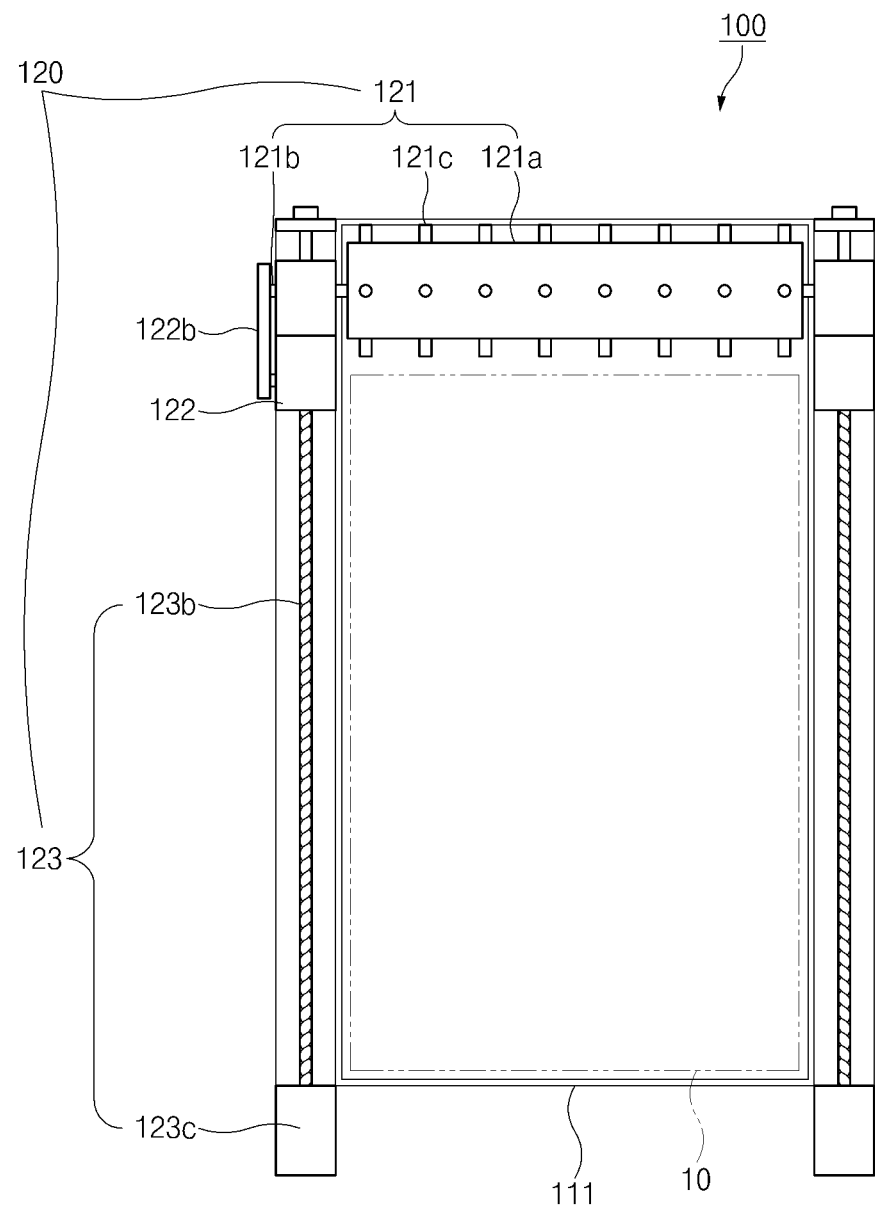
FIG. 3 is a plan view illustrating the apparatus of manufacturing the aerogel sheet according to the present invention.
Figure 4:
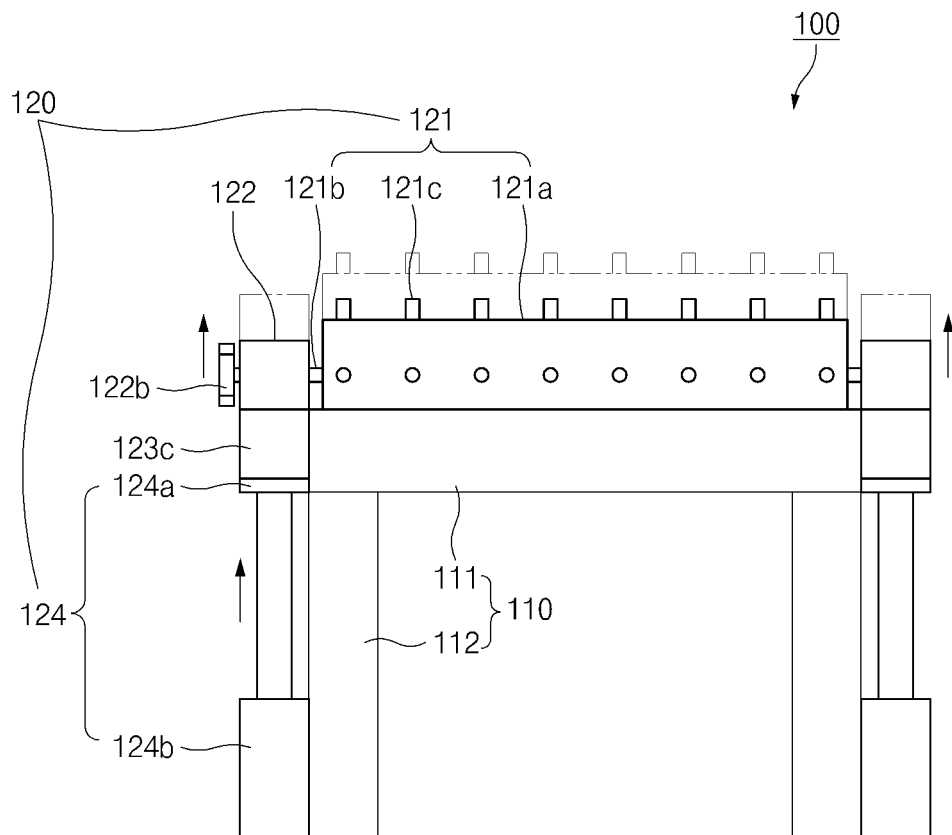
FIG. 4 is a front view illustrating the apparatus of manufacturing the aerogel sheet according to the present invention.

As illustrated in FIGS. 2 to 4, the impregnation device 120 is configured to put the silica sol precursor into the surface of the blanket 10 and includes a rotation roller 121 putting the silica sol precursor 40 to the top surface of the blanket 10, a rotation member 122 rotating the rotation roller 121 forward or backward, a moving member 123 moving the rotation roller 121 from one end to the other end of the top surface of the blanket 10, and an elevation member allowing the rotation roller 121 to ascend or descend.

That is, the impregnation device 120 may adjust a height of the rotation roller 121 through the rotation member 122, the moving member 123, and the elevation member 124. Also, the impregnation device may move the rotation roller 121 from one end to the other end of the top surface of the blanket 10 while rotating the rotation roller 121 to put the silica sol precursor 40 into the surface of the blanket 10.

Hereinafter, constituents of the impregnation device 120 will be described in more detail.

The rotation roller 121 is configured to inject and impregnate the silica sol precursor while rotating and moving from the one end to the other end of the surface of the blanket 10 disposed in the fixing vessel and includes a cylindrical roller part 121a disposed above the fixing member 111 to store the silica sol precursor 40 therein, a rotation shaft 121b disposed at a rotation center of the roller part 121a to rotate the roller part 121a, and an injection nozzle 121c disposed on a circumference of the roller part 121a to inject the silica sol precursor 40 stored in the roller part 121a and thereby to put the silica sol precursor 40 into the blanket 10.

Here, the roller part 121a may move from the one end to the other end of the surface of the blanket 10 while rotating to press a top surface of the silica sol precursor 40 put into the blanket 10, thereby uniformly adjusting a height of the silica sol precursor 40.

Also, the injection nozzle 121c may be regularly or irregularly provided in plurality in a longitudinal direction and a circumferential direction on the circumference of the roller part 121a to more uniformly inject the silica sol precursor 40 stored in the roller part 121a to the surface of the blanket 10.

The injection nozzle 121c protrudes from the circumferential surface of the roller part 121a. That is, when the silica sol precursor 40 is injected to only the surface of the blanket 10, there is a problem that the silica sol precursor 40 is not impregnated up to a bottom surface of the blanket 10.

Thus, since the injection nozzle 121c protrudes from the circumferential surface of the roller part 121a, when the roller part 121a is supported by or presses the top surface of the blanket 10, the injection nozzle 121c is injected into the blanket 10 to inject the silica sol precursor 40 into the blanket 10, thereby uniformly impregnating the silica sol precursor 40 into the blanket 10.

The rotation member 122 is configured to rotate the rotation roller 121. That is, the rotation member 122 is connected to the rotation shaft 121b of the rotation roller 121 to transmit power to the rotation shaft 121b so that the roller part 121a of the rotation roller 121 rotates.

For example, as illustrated in FIGS. 1 to 6, the rotation member 122 includes a driving shaft coupled to a driving gear 122a. A driven gear 121b-1 is disposed on the rotation shaft 121b of the rotation roller 121, and the driving gear 122a and the driven gear 121b-1 are connected to each other through a chain or belt 122*b*. In the rotation member 122, when the driving shaft rotates, the chain or belt 122*b* circulates by the driving gear 122*a*, and then the driven gear 121*b*-1 rotates by the chain or belt 122*b* to rotate the rotate roller 121 including the rotation shaft 122*b*. Here, a driving motor having stable rotation force may be used as the rotation member 122.

Figure 6:
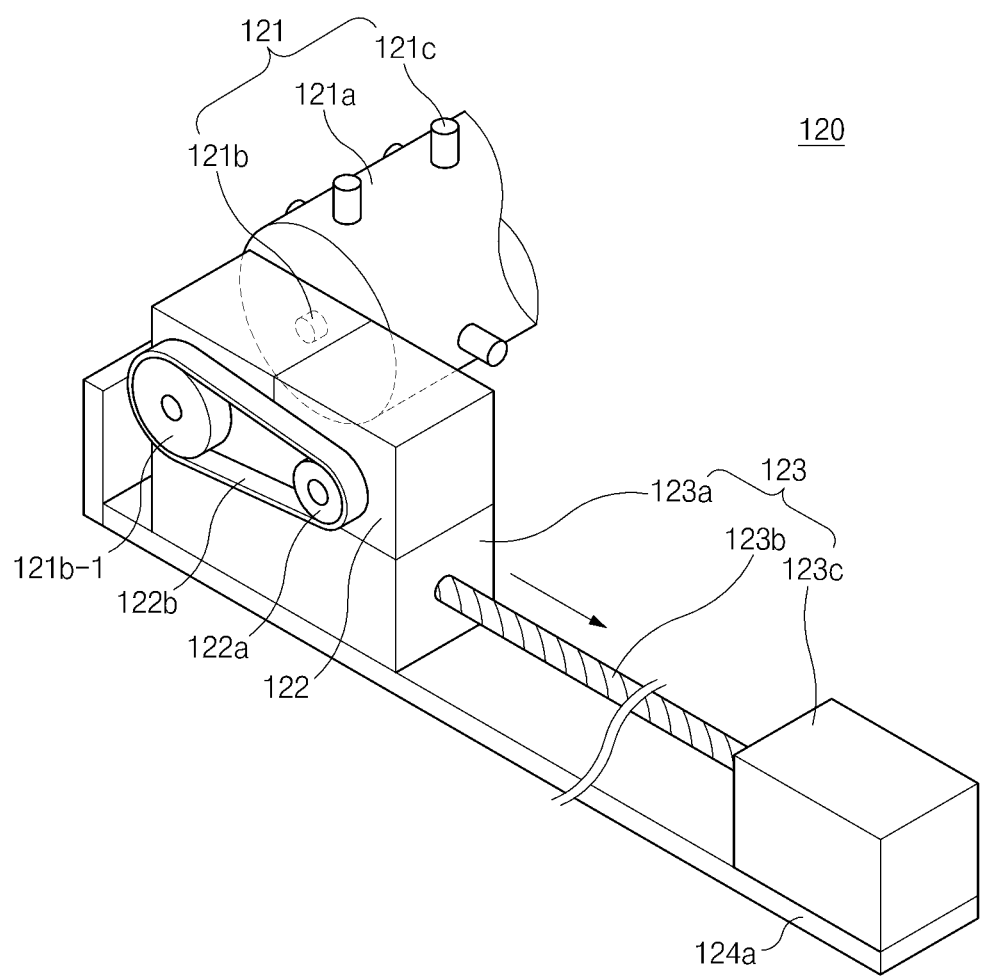
FIG. 6 is a perspective view of a rotation member provided in the apparatus of manufacturing the aerogel sheet according to the present invention.
Figure 7:
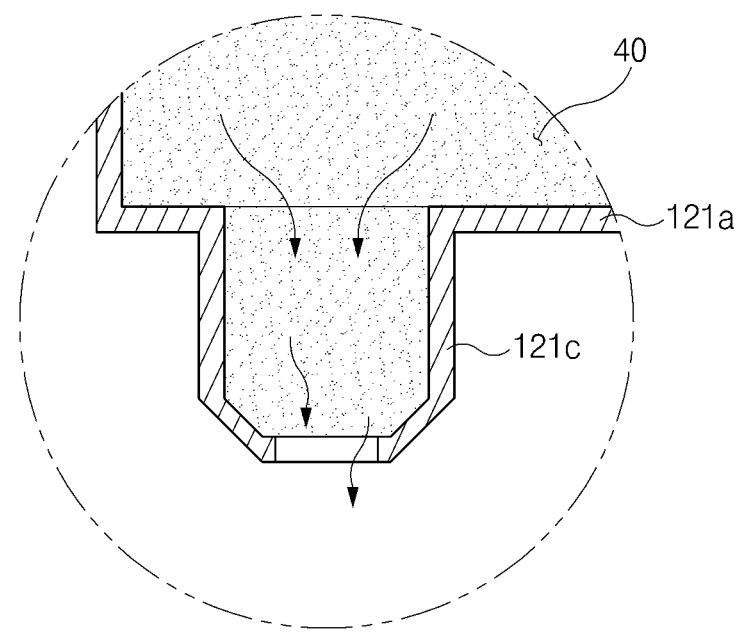
FIG. 7 is an enlarged view of a portion A of FIG. 5.

As illustrated in FIGS. 1 and 6, the moving member 123 moves the rotation roller 121, i.e., moves the rotation roller 121 forward from the one end to the other end of the blanket 10 or moves the rotation roller 121 backward from the one end to the other end of the blanket to return to its original position.

For example, the moving member 123 includes a movable piece 123 *a* on which the rotation shaft 121 *b* and the rotation member 122 of the rotation roller 121 are installed, a screw piece 123 *b* moving the movable piece 123 *a* forward from one end to the other end of the fixing member 111 and vice versa, and a rotation motor 123 *c* coupled to one end of the screw piece 123 *b* to rotate the screw piece 123 *b*.

Here, a male screw thread is disposed on an outer circumferential surface of the screw piece 123 *b*, and a through-hole having a female screw thread and coupled to the male screw thread of the screw piece 123 *b* is defined in the movable piece 123 *a*. That is, when the screw piece 123 *b* rotates, the male screw thread and the female screw thread are coupled to each other to move while the movable piece 123 *a* rotates. Here, since the movable piece 123 *a* is supported by a side portion of the fixing member 111, the movable piece 123 *a* moves forward or backward along the screw piece 123 *b* without rotating.

As described above, in the moving member 123, the movable piece 123*a* moves horizontally along the screw piece 123*b*. Thus, the rotation roller 121 may move from the one end to the other end of the blanket 10 at the same height to uniformly adjust the height of the silica sol precursor 40 put into the surface of the blanket 10.

In the impregnation device 120 having the above-described configuration, the rotation roller 121 rotates and moves through the rotation member 122 and the moving member 123 to uniformly inject and put the silica sol precursor 40 stored in the rotation roller 121 from the one end to the other end of the top surface of the blanket 10. Particularly, the injection nozzle 121*c* may be inserted into the blanket 10 to improve the impregnation of the silica sol precursor 40.

The impregnation device 120 may further include the elevation member 124 for adjusting a height of the rotation roller 121. For example, the elevation member 124 disposed on a side portion of the fixing member 111 includes an elevation piece 124*a* on which the rotation roller 121, the rotation member 122, and the moving member 123 are installed and a cylinder 124*b* installed to the fixing legs 112 to allow the elevation piece 124*a* to ascend or descend in a state in which the elevation piece 124 is disposed horizontally. That is, when the elevation piece 124 ascends through the cylinder 124*b*, the elevation member 124 may allow the rotation roller 121, the rotation member 122, and the moving member 123 to ascend together with the elevation piece 124*a*. Thus, the rotation roller 121 may ascend to be spaced apart from the top surface of the blanket 10. On the other hand, when the elevation piece 124*a* descends through the cylinder 124*b*, the rotation roller 121, the rotation member 122, and the moving member 123 may descend together with the elevation piece 124*a*. As a result, the rotation roller 121 may descend to be closely attached to the top surface of the blanket 10.

Here, the elevation member 124 may adjust the height of the rotation roller 121 in two stages or more to improve the impregnation of the blanket 10. For example, the elevation member 124 may allow the rotation roller 121 to descend so that the injection nozzle 121*c* disposed on a lower portion of the rotation roller 121 is inserted up to the bottom surface of the blanket 10 to primarily adjust the height of the rotation roller 121 and allow the rotation roller 121 to ascend so that the injection nozzle 121*c* is disposed at an inner center of the blanket 10 to secondarily adjust the height of the rotation roller 121.

That is, when the rotation roller 121 moves forward from the one end to the other end of the fixing member 111, the elevation member 124 primarily adjusts the height of the rotation roller 121 so that the injection nozzle 121*c* is inserted up to the bottom surface of the blanket. Also, when the rotation roller 121 returns from the other end to the one end of the fixing member 111, the elevation member 124 secondarily adjusts the height of the rotation roller 121 so that the injection nozzle 121*c* is disposed at the inner center of the blanket 10. Here, when the rotation roller returns to its original position, the silica sol precursor 40 may be adjusted in height while the top surface of the silica sol precursor 40 put into the blanket 10 is supported by the circumferential surface of the rotation roller 121.

As described above, the impregnation device 120 may improve the impregnation of the silica sol precursor 40 put into the blanket 10 and also induce the stable gelation of the silica sol precursor 40, and particularly, uniformly adjust the height of the silica sol precursor 40 put into the blanket 10.

Figure 5:
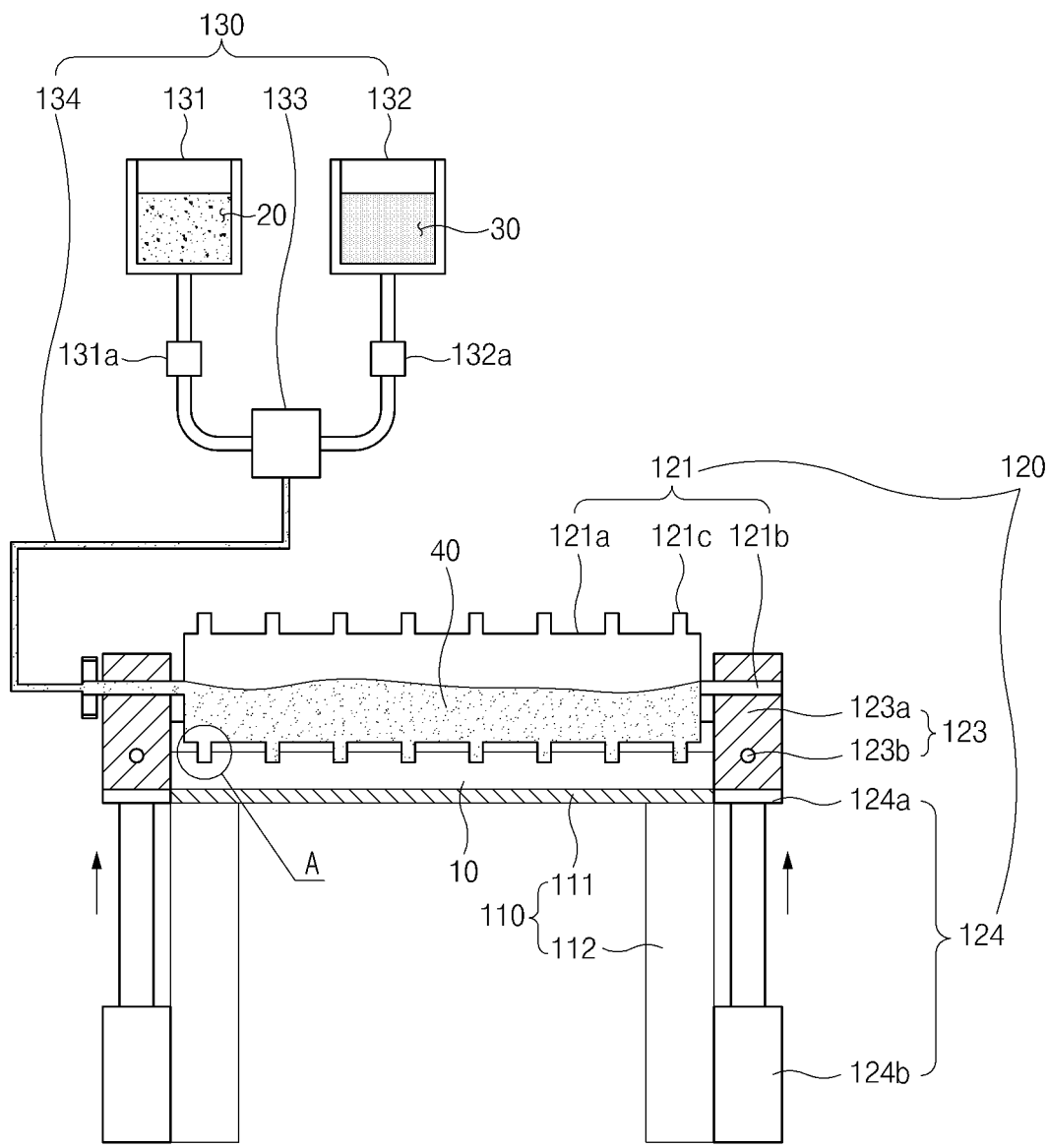
FIG. 5 is a cross-sectional view illustrating the apparatus of manufacturing the aerogel sheet according to the present invention.

As illustrated in FIG. 5, the apparatus 100 of manufacturing the aerogel sheet according to the present invention may further include a supply device 130 supplying the silica sol precursor 40 to the rotation roller 121 of the impregnation device 120.

For example, the supply device 130 includes a silica sol vessel 131 in which silica sol 20 is accommodated, a catalyst vessel 132 in which a gelling catalyst 30 is accommodated, a mixing vessel 133 in which the silica sol 20 of the silica sol vessel 131 and the gelling catalyst 30 of the catalyst vessel 132 are introduced and mixed to prepare the silica sol precursor 40, and a connection tube 134 connecting the mixing vessel 133 to the rotation roller 121.

Here, the silica sol 20 may be prepared by mixing tetraethyl orthosilicate (TEOS) with ethanol. That is, 1.2 kg of TEOS and 2.7 kg of ethanol are provided in a reaction bath (not shown) to prepare the silica sol.

A hydrolyzed solvent having high reactivity with water may be used as the TEOS to improve reactivity. That is, the hydrolyzed TEOS and the ethanol may be mixed to obtain the silica sol having excellent reactivity.

Also, the gelling catalyst 30 is prepared by mixing ethanol with ammonia water ($NH_4OH$). That is, 0.5 kg of ethanol and 30 ml of ammonia water ($NH_4OH$) are mixed in the reaction bath (not shown) to prepare the gelling catalyst 30.

Also, the connection tube 134 is connected to the rotation shaft 121*b* of the rotation roller 121 so as to be freely rotatable or sealed. Thus, the connection tube 134 may be prevented from being twisted even though the rotation roller 121 rotates.

An operation state of the apparatus of manufacturing the aerogel sheet, which includes the above-described constituents, according to the present invention will be described as follows.

Figure 8:
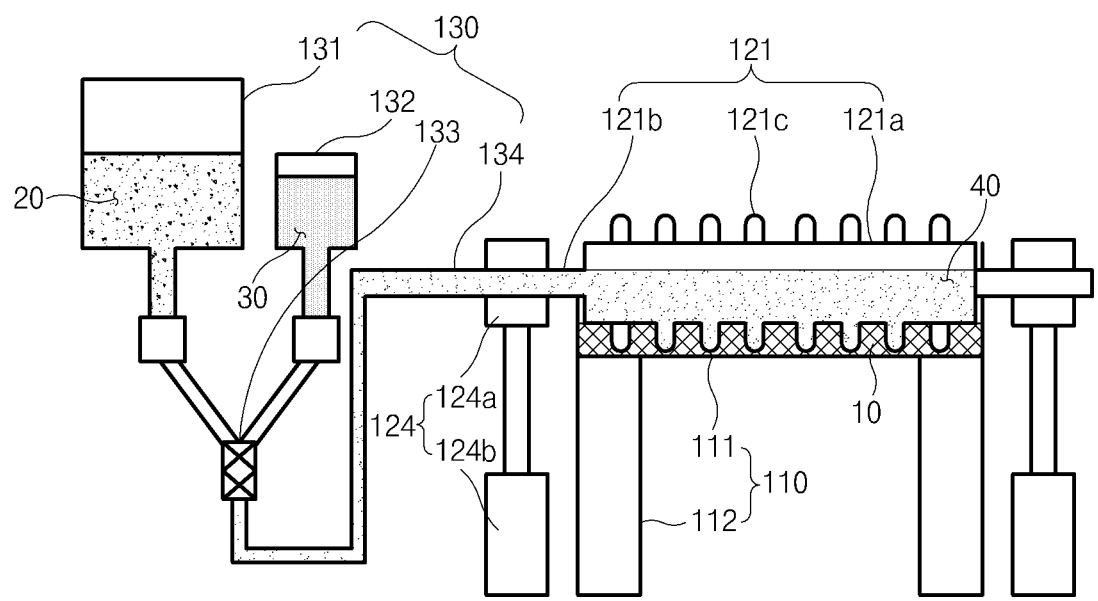
FIGS. 8 and 9 are views illustrating an operation state of the apparatus of manufacturing the aerogel sheet according to the present invention.

As illustrated in FIG. 8, the silica sol precursor 40 is prepared through the supply device 130. That is, the silica sol 20 is introduced into the silica sol vessel 131 of the supply device 130, and the gelling catalyst 30 is introduced into the catalyst vessel 132. In this state, when valves 131a and 132a provided in the silica sol vessel 131 and the catalyst vessel 132 are opened, the silica sol 20 of the silica sol vessel 131 and the gelling catalyst 30 of the catalyst vessel 132 are introduced into the mixing vessel 133 and then mixed with each other to prepare the silica sol precursor 40. Then, the silica sol precursor 40 of the mixing vessel 133 is supplied to the rotation roller 121 of the impregnation device 120 through the connection tube 134.

Figure 9:
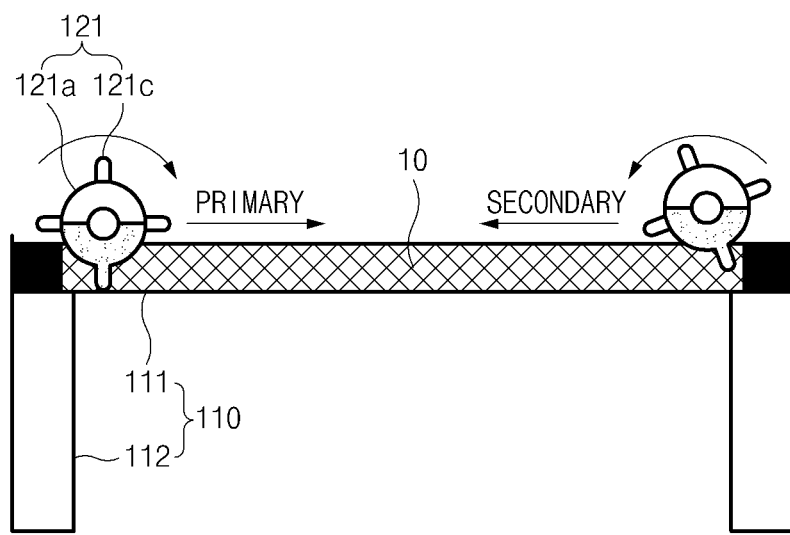

As described above, when the preparation of the silica sol precursor 40 is completed, as illustrated in FIG. 9, the blanket 10 is inserted into the accommodation groove 111a of the fixing vessel 110, and then, the silica sol precursor 40 supplied from the mixing vessel 134 is put into the blanket 10 through the impregnation device 120.

That is, the impregnation device 120 may allow the rotation roller 121 to descend through the elevation member 124, thereby primarily adjusting the height of the rotation roller 121 so that the injection nozzle 121c disposed at the lower portion of the rotation roller 121 is injected up to the bottom surface of the blanket 10. In this state, the moving member 123 and the rotation member 122 operate at the same time to allow the rotation roller 121 to move and rotate forward from the one end to the outer end of the fixing member 111. Here, the rotation roller 121 discharges the stored silica sol precursor 10 through the injection nozzle 121c while rotating to impregnate and gelate the silica sol precursor 10 into the blanket 10.

When the rotation roller 121 moves up to the other end of the fixing member 111, the elevation member 124 allow the rotation roller 121 to ascend to a predetermined height from the top surface of the blanket 10, thereby secondarily adjusting the height of the rotation roller 121. Here, the silica sol precursor 40 impregnated into the blanket 10 may be adjusted in thickness according to the height of the rotation roller 121. When the height of the rotation roller 121 is completely adjusted, the moving member 230 and the rotation member 132 operate at the same time to allow the rotation roller 121 to move form the other end to the one end of the fixing member 111 and also rotate reversely. Here, the rotation roller 121 may secondarily put the silica sol precursor 40 into the surface of the blanket 10 while rotating, and simultaneously, may uniformly adjust the thickness of the silica sol precursor 40 impregnated into the surface of the blanket 10 through the roller part 121a.

Thus, the apparatus 100 of manufacturing the aerogel sheet according to the present invention may improve the impregnation of the silica sol precursor put into the blanket and induce the stable gelation of the silica sol precursor, and particularly, may uniformly adjust the height of the silica sol precursor put into the blanket through the rotation roller to improve the quality.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. An apparatus of manufacturing an aerogel sheet, the apparatus comprising:
a fixing vessel into which a blanket is inserted; and
an impregnation device putting a silica sol precursor into the blanket inserted into the fixing vessel to impregnate and gelate the silica sol precursor, wherein the impregnation device comprises a rotation roller moving from one end to the other end of a top surface of the blanket while rotating to put the silica sol precursor into the blanket and thereby to impregnate and gelate the silica sol precursor;
wherein the rotation roller has a smooth outer peripheral surface defining the body of the rotation roller, and comprises on the outer peripheral surface a series of discrete cylindrical injection nozzles that protrude outwardly from and extend above the outer peripheral surface of the rotation roller, and the cylindrical injection nozzles discharge the silica sol precursor through an opening in a distal end of each of the cylindrical injection nozzles.

2. The apparatus of claim 1, wherein the rotation roller moves from one end to the other end of the top surface of the blanket at the same height.

3. The apparatus of claim 1, wherein the impregnation device comprises a rotation member rotating the rotation roller.

4. The apparatus of claim 1, wherein the impregnation device comprises a moving member moving the rotation roller from one end to the other end of the top surface of the blanket.

5. The apparatus of claim 1, wherein the impregnation device comprises an elevation member allowing the rotation roller to descend to the top surface of the blanket or ascend from the top surface of the blanket.

6. The apparatus of claim 5, wherein the elevation member primarily adjusts a height of the rotation roller so that an injection nozzle disposed at a lower portion of the injection roller is inserted up to a bottom surface of the blanket and secondarily adjusts a height of the rotation roller so that the injection nozzle is inserted at an inner center of the blanket.

7. The apparatus of claim 6, wherein the primary height adjustment of the rotation roller by the elevation member is performed when the rotation roller moves forward from the one end to the other end of the top surface of the blanket.

8. The apparatus of claim 6, wherein the secondary height adjustment of the rotation roller by the elevation member is performed when the rotation roller moves backward from the one end to the other end of the top surface of the blanket.

9. The apparatus of claim 1, further comprising a supply device supplying the silica sol precursor to the rotation roller.

10. The apparatus of claim 9, wherein the supply device comprises a silica sol vessel in which silica sol is accommodated, a catalyst vessel in which a gelling catalyst is accommodated, a mixing vessel in which the silica sol of the silica sol vessel and the gelling catalyst of the catalyst vessel are introduced and mixed to prepare the silica sol precursor, and a connection tube connecting the mixing vessel to the rotation roller.

11. The apparatus of claim 10, wherein the silica sol is prepared by mixing tetraethyl orthosilicate (TEOS) with ethanol.

12. The apparatus of claim 11, wherein the tetraethyl orthosilicate (TEOS) comprises hydrolyzed TEOS.

13. The apparatus of claim 10, wherein the gelling catalyst is prepared by mixing ethanol with ammonia water ($NH_4OH$).

14. The apparatus of claim 10, wherein the connection tube is connected to a rotation shaft of the rotation roller so as to be freely rotatable and sealed.

15. The apparatus of claim 4, wherein the moving member comprises:

a movable piece on which a rotation shaft of the rotation roller and a rotation member configured to rotate the rotation roller are installed;

a screw piece configured for moving the movable piece from one end to the other end of the fixing vessel; and a rotation motor coupled to one end of the screw piece and configured to rotate the screw piece.

16. The apparatus of claim 3, wherein rotation member comprises a driving motor configured to rotate the rotation roller.

17. The apparatus of claim 16, wherein the driving motor comprises a driving shaft coupled to a driving gear connected to a driven gear disposed on a rotation shaft of the rotation roller, and the driving gear and the driven gear are connected to each other through a chain or belt.

18. The apparatus of claim 1, wherein a diameter of the opening in the distal end of each of the cylindrical injection nozzles is less than an inner diameter of the cylindrical injection nozzle.

19. The apparatus of claim 1, wherein each of the cylindrical injection nozzles comprises a truncated conical section terminating in the opening at the distal end of each of the cylindrical injection nozzles.

* * * * *